(12) United States Patent
Tuukkanen

(10) Patent No.: US 10,548,007 B2
(45) Date of Patent: Jan. 28, 2020

(54) SECURITY OPERATIONS FOR WIRELESS DEVICES

(71) Applicant: HERE Global B.V., Eindhoven (NL)

(72) Inventor: Marko Tapio Tuukkanen, Schlenzer (DE)

(73) Assignee: HERE Global B.V., Eindhoven (NL)

( * ) Notice: Subject to any disclaimer, the term of this patent is extended or adjusted under 35 U.S.C. 154(b) by 265 days.

(21) Appl. No.: 15/036,601

(22) PCT Filed: Nov. 15, 2013

(86) PCT No.: PCT/IB2013/060171
§ 371 (c)(1),
(2) Date: May 13, 2016

(87) PCT Pub. No.: WO2015/071707
PCT Pub. Date: May 21, 2015

(65) Prior Publication Data
US 2016/0286396 A1 Sep. 29, 2016

(51) Int. Cl.
| | |
|---|---|
| G06F 21/00 | (2013.01) |
| H04W 12/06 | (2009.01) |
| G06F 21/40 | (2013.01) |
| H04L 29/06 | (2006.01) |
| H04L 9/08 | (2006.01) |

(52) U.S. Cl.
CPC ......... *H04W 12/06* (2013.01); *G06F 21/40* (2013.01); *H04L 9/085* (2013.01); *H04L 63/0853* (2013.01); *H04L 63/105* (2013.01); *H04L 63/18* (2013.01)

(58) Field of Classification Search
CPC .............................. H04W 12/06; G06F 21/40
USPC ............................................................ 726/5
See application file for complete search history.

(56) References Cited

U.S. PATENT DOCUMENTS

| | | | |
|---|---|---|---|
| 6,774,796 B2 | 8/2004 | Smith | |
| 6,959,394 B1 | 10/2005 | Brickell et al. | |
| 2002/0164033 A1 | 11/2002 | Rajasekaran | |
| 2008/0263363 A1 | 10/2008 | Jueneman et al. | |
| 2012/0233674 A1 | 9/2012 | Gladstone et al. | |
| 2013/0061298 A1 | 3/2013 | Longobardi et al. | |
| 2014/0279101 A1* | 9/2014 | Duplan | G06Q 20/3224 705/18 |
| 2016/0007200 A1* | 1/2016 | Shibata | H04W 12/08 713/168 |

(Continued)

FOREIGN PATENT DOCUMENTS

WO    WO 2012/143706 A1    10/2012

OTHER PUBLICATIONS

International Search Report and Written Opinion for Application No. PCT/IB2013/060171 dated Aug. 22, 2014.

(Continued)

*Primary Examiner* — Anthony D Brown
(74) *Attorney, Agent, or Firm* — Alston & Bird LLP

(57) ABSTRACT

Methods and apparatuses are disclosed for determining based on predetermined criteria a combination of one or more user devices to be used for a security operation from a set of associated user devices. The user devices are configured to wirelessly communicate security information. In response to the determination security information is communicated by the determined combination of one or more user devices.

18 Claims, 5 Drawing Sheets

(56) References Cited

U.S. PATENT DOCUMENTS

Figure 1:
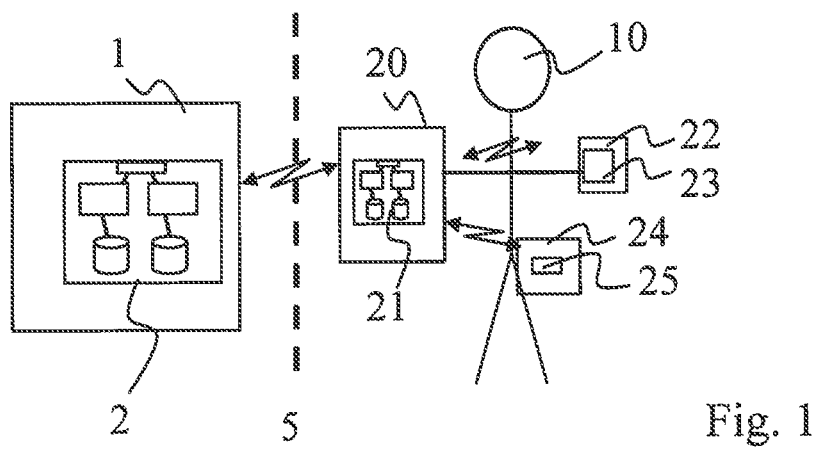

2018/0032997 A1* 2/2018 Gordon .............. G06Q 20/3224

OTHER PUBLICATIONS

The Apple Watch | askTog [online] [retrieved Aug. 29, 2013]. Retrieved from the Internet: <asktog.com/atc/apple-iwatch/>, (Feb. 6, 2013) 17 pages.
App.net | mrgan: @siracusa People buying expensive devices because . . . [online] [retrieved Aug. 29, 2013]. Retrieved from the Internet: <https://alpha.app.net/mrgan/post/2928506>. (no date available) 18 pages.
Bischof, H-P, et al., *A New Framework for Building Secure Collaborative Systems in Ad Hoc Network*, [online] [retrieved Aug. 29, 2013]. Retrieved from the Internet: http://www.cs.rit.edu/~anhinga/publications/Montreal_October_03.pdf (2003) 12 pages.
Simonite, T., *Millions of Passwords Have Been Stolen From Companies Such as LinkedIn and Yahoo, A New Approach Aims to Prevent Future Heists*, MIT Technology Review (Oct. 9, 2012) 2 pages.

\* cited by examiner

SECURITY OPERATIONS FOR WIRELESS DEVICES

CROSS REFERENCE TO RELATED APPLICATIONS

This application is a national stage 371 application of International Application No. PCT/IB2013/060171, filed Nov. 15, 2013, the entire contents of which are hereby incorporated by reference.

This disclosure relates to security operations and more particularly to security operations in association with user devices with wireless communication capabilities.

Wireless communications can be provided between devices such as fixed and/or mobile devices, base stations and other access points, servers, wearable items, machine type devices, vehicles, and so on. The wireless communications can be provided for example over radio links and optical links. Wireless links can be provided for communication of various types of information, for example for communications of control and user information and/or for using various applications.

A wireless user device can be used for communication of security information. The security information can relate to various actions the user may wish to take. For example, a user may wish to order and/or pay for goods and/or services, send confidential data, or needs to be authorised and/or authenticated for any other reason in circumstances where at least some level of security is required. The required security information can be communicated over a wireless link from the user device to a data processor device of the other party. The security mechanisms can be based on use of security credentials such as passwords, keys, secrets or other codes a user device is configured to communicate to the other party for the purposes of a security operation.

In accordance with an aspect there is provided a method comprising determining based on predetermined criteria a combination of one or more user devices to be used for a security operation from a set of associated user devices configured to wirelessly communicate security information, and causing communication of security information by the determined combination of one or more user devices.

In accordance with another aspect there is provided an apparatus comprising at least one processor, and at least one memory including computer program code, wherein the at least one memory and the computer program code are configured, with the at least one processor, cause the apparatus at least to determine based on predetermined criteria a combination of one or more user devices to be used for a security operation from a set of associated user devices and to cause wireless communication of security information by the determined combination of one or more user devices.

In accordance with a more detailed aspect the predetermined criteria is based on required level of security. The required level of security can depend on the value and/or importance of an action to be secured by the security operation.

In another detailed aspect at least two user devices each have a part of security credentials. The devices are determined to be located in a predefined manner relative to each other. In response to the determining communications of said parts of security credentials are communicated. In accordance with a possibility distance between user devices is determined, and use of user devices for the security operation is controlled based at least in part on the result of the determination.

In accordance with a specific aspect an action processor device can determine that more than one user device is needed for securing an action. The action processor device can communicate to a first user device or directly to at least one second user device instructions for causing communication of security credentials from the at least one second user device. In an aspect a first user device is configured to determine that more than one user device is needed for securing an action. The first user device then communicates to at least one second user device instructions for causing communication of security credentials from the at least one second user device.

In accordance with a specific aspect, when security credentials are received from at least one second user device, these are send to a transaction data processing device.

Security credentials may be communicated from a second user device to another party directly or via a first user device.

In accordance with a specific aspect the outcome of the security operation is determined based on information of the order security information provided by at least two user devices and/or the source of security information and/or the identity of at least one user device.

In accordance with a specific aspect a notification is presented via at least one user device of the set of associated user devices in response to determination an unsuccessful security operation.

A device comprising the described apparatus and arranged to implement the embodiments can also be provided. The device may comprise one of a backend server, a transaction terminal and a mobile user device. At least one of the mobile user devices can be a mobile communication device such as a mobile phone, a smart phone, a personal data assistant, a notebook, a tablet computer or a laptop computer, or a wearable device such as a smart watch, smart eyeglasses or clothing, decorative items or jewelry, for example rings, bracelets, necklaces and pedants with communication and data processing capabilities. A system comprising at least one of such device can also be provided.

A computer program comprising program code adapted to perform the herein described methods may also be provided. In accordance with further embodiments apparatus and/or computer program product that can be embodied on a computer readable medium for providing at least one of the above methods is provided.

It should be appreciated that any feature of any aspect may be combined with any other feature of any other aspect.

Figure 2:
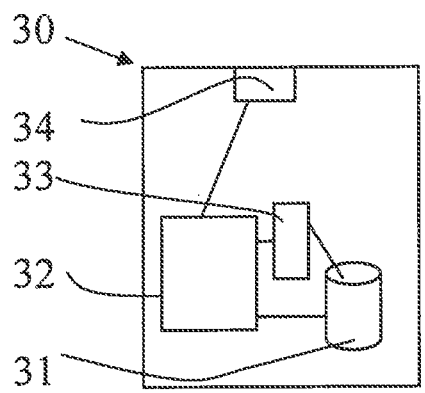
Figure 3:
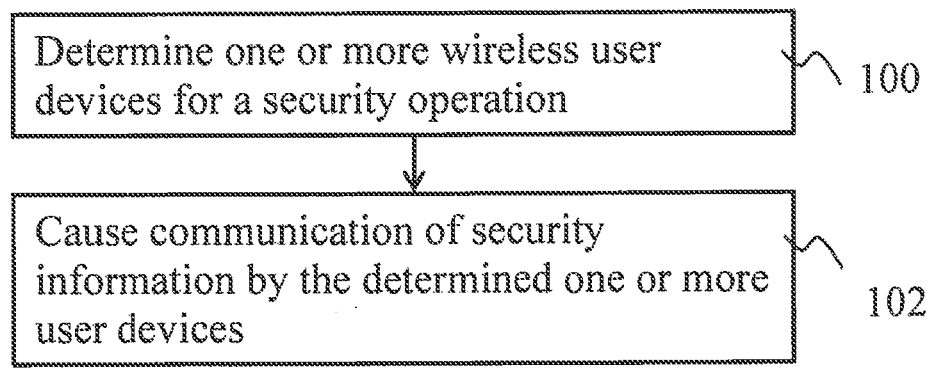
Figure 4:
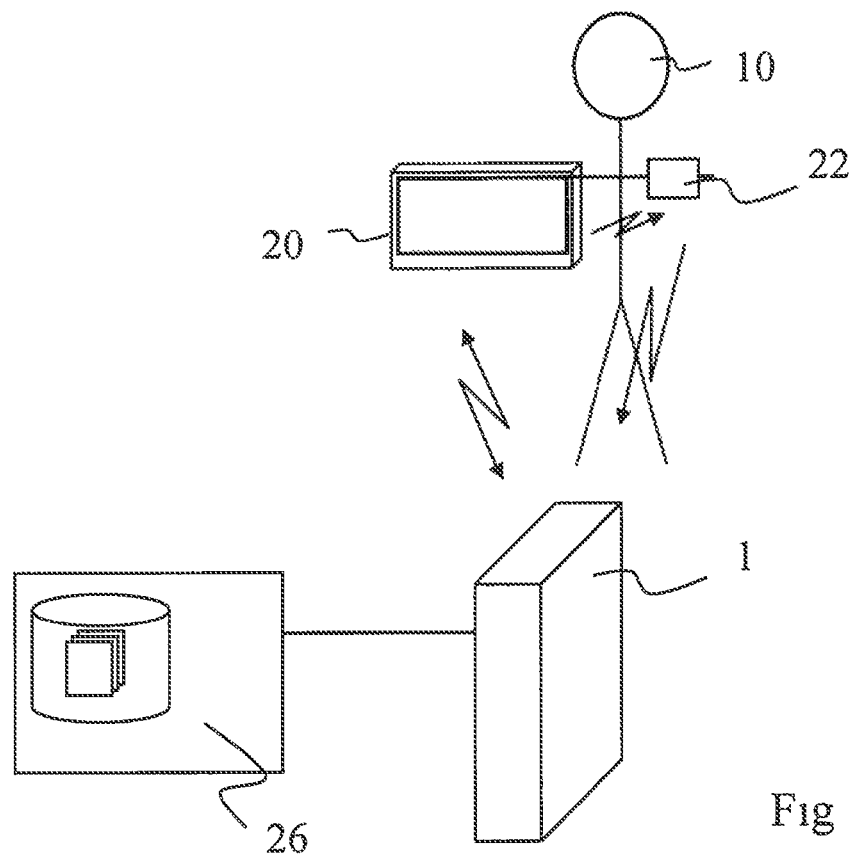
Figure 5:
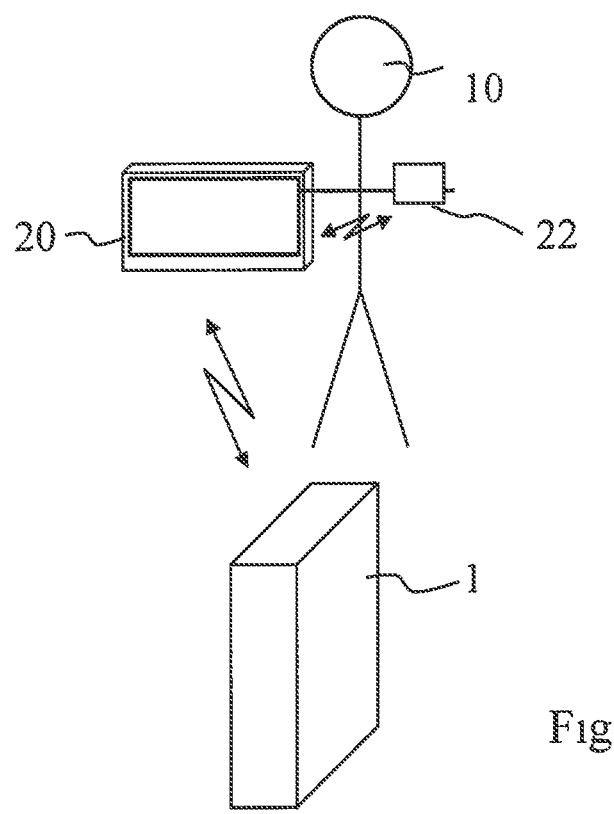
Figure 6:
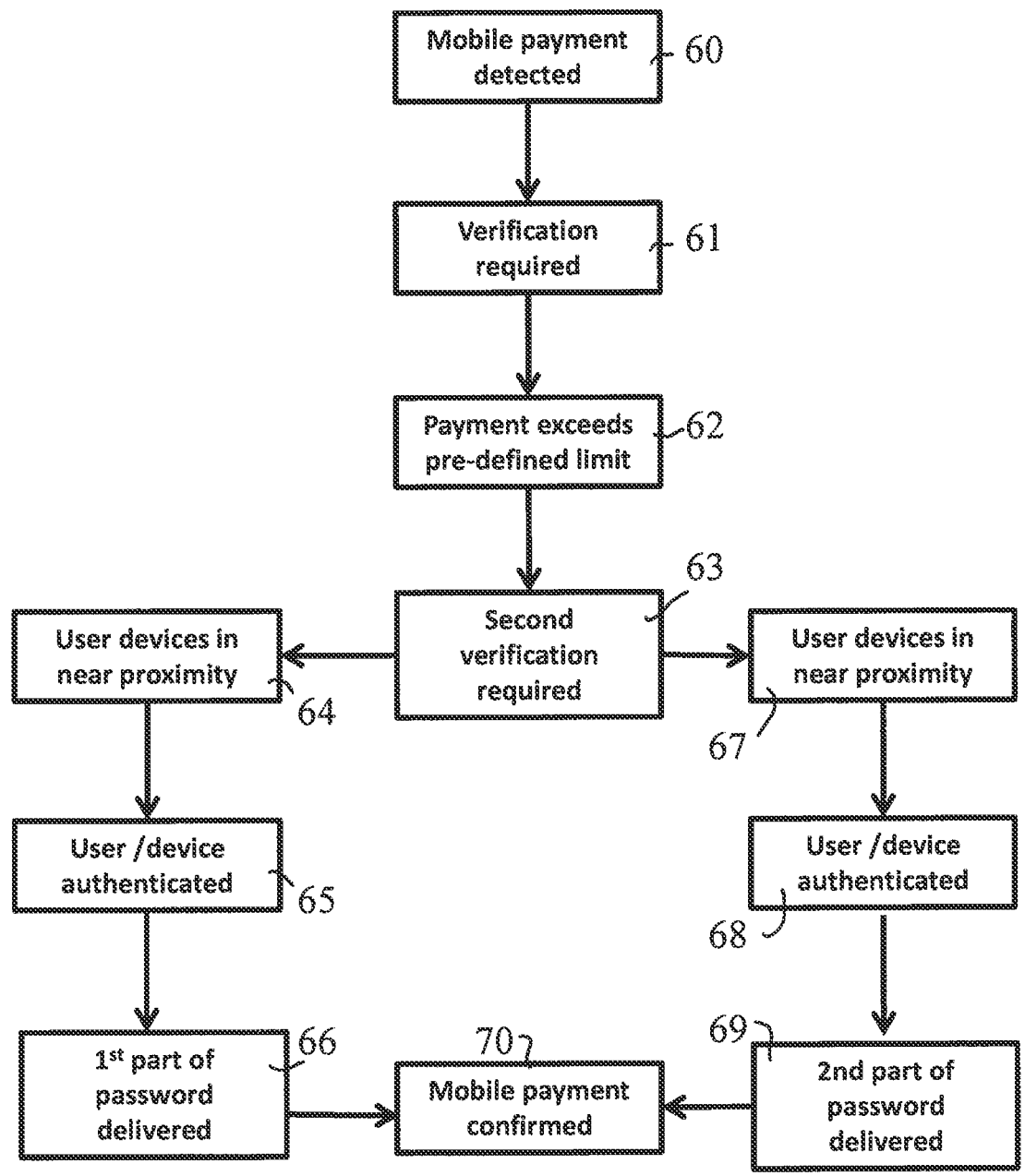
Figure 7A:
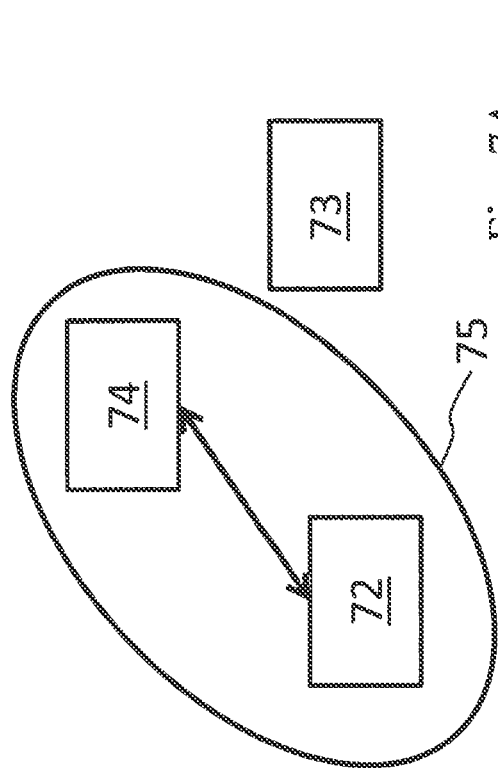
Figure 7B:
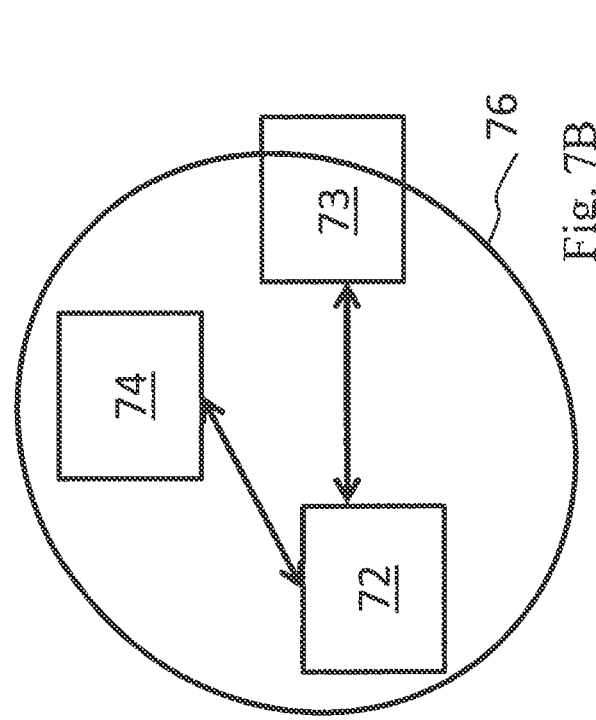
Figure 7C:
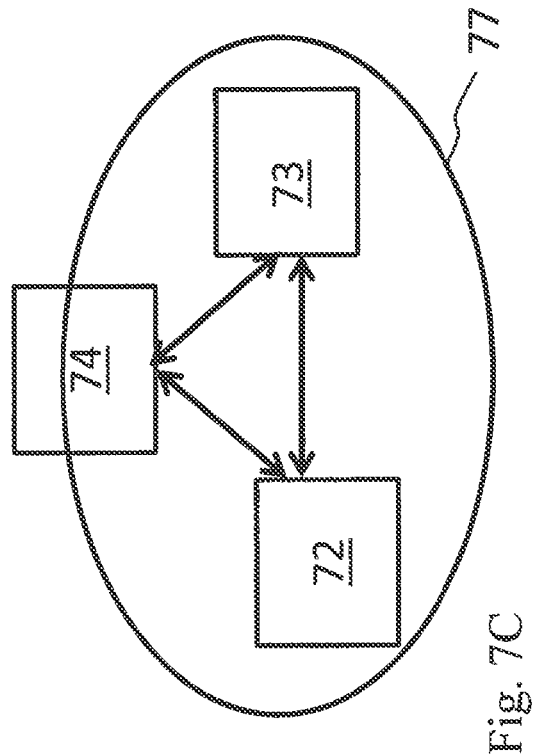
Figure 7D:
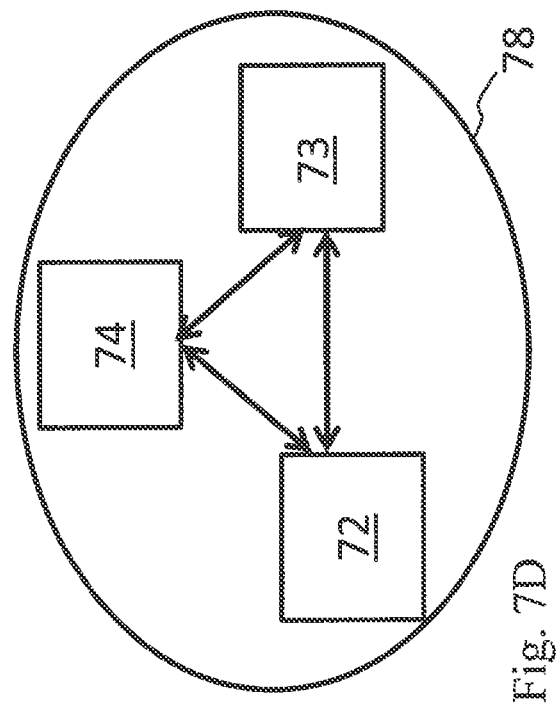
Figures 8, 9:
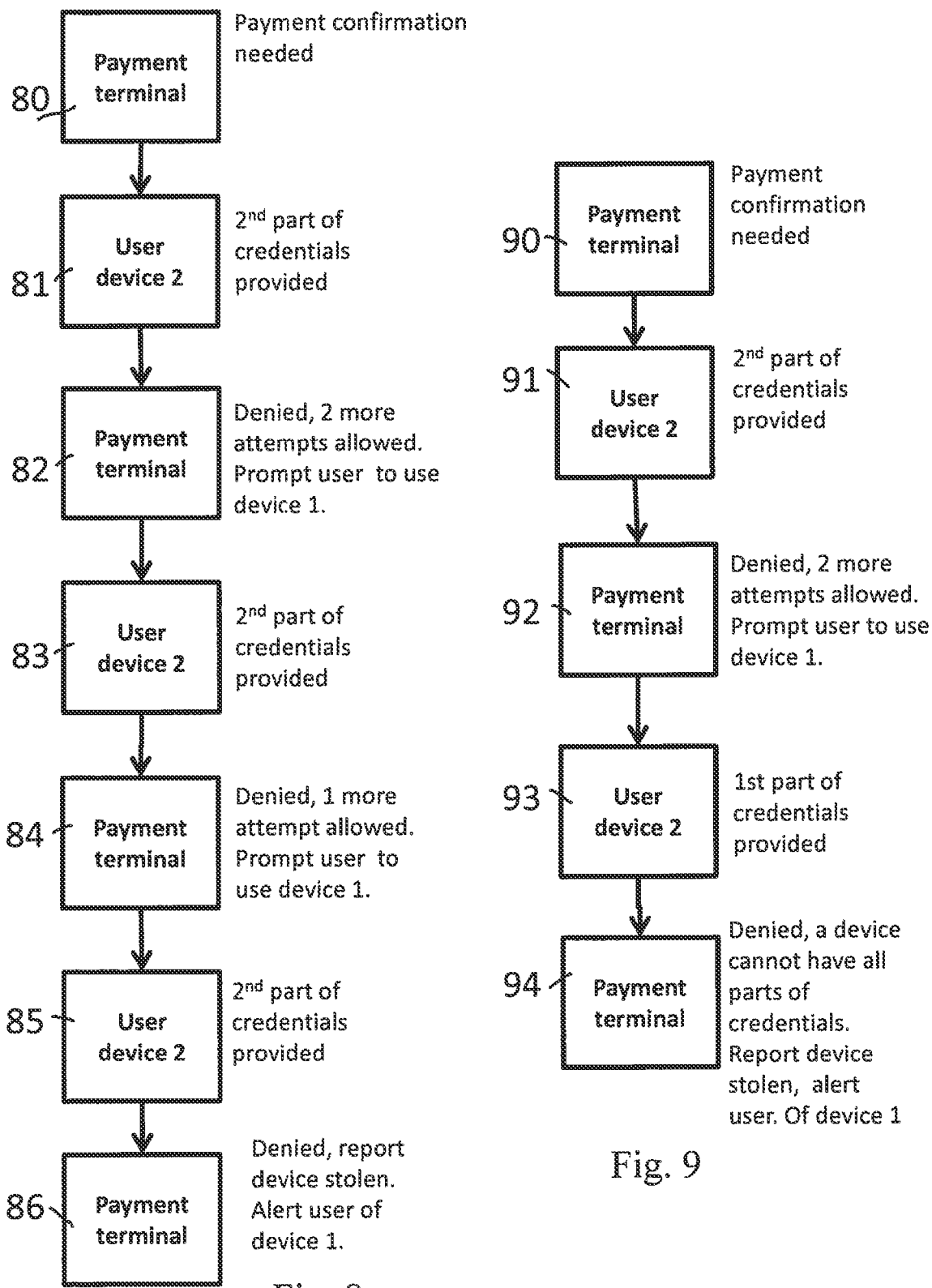

Embodiments will now be described in further detail, by way of example only, with reference to the following examples and accompanying drawings, in which:

FIG. 1 shows an example of an arrangement where a user with multiple devices communicated with a device of another party, FIG. 2 shows an example of a control apparatus, FIG. 3 is a flowchart in accordance with an embodiment, FIGS. 4 and 5 show examples of use scenarios, FIG. 6 shows a flow diagram in accordance with an exemplifying scenario, FIGS. 7A to 7D illustrate an example of how to provide different levels of security in accordance with an embodiment, and FIGS. 8 and 9 illustrate examples of failed security operations.

In the following certain exemplifying embodiments are explained in the context where wireless transmission is provided between various apparatus, for example between at least two user devices and a terminal device or a server device of another party. For ease of understanding the context a brief explanation of possible devices and components thereof is given first with reference to FIGS. 1 and 2.

FIG. 1 shows mobile user devices 20, 22 and 24 of a user 10. Each mobile user device is provided with wireless communication capability, and can hence be termed a wireless device. A mobile user device can be e.g. a handheld or otherwise portable device, for example a wearable device. A wireless user device can be provided by any device provided with communication apparatus for communication on one or more wireless links. Non-limiting examples of wireless devices include a mobile station (MS) such as a mobile phone, e.g. a 'smart phone' or a feature phone, a portable computer such as a laptop, tablet, notebook or a personal data assistant (PDA) provided with wireless communication capabilities. In FIG. 1 device 20 depicts such a handheld device. Devices 22 and 24 depict additional wireless devices of the user. Such devices can be e.g. wearable wireless devices integrated with watches or smart watches, eyewear, helmets, hats, clothing, ear pieces with wireless connectivity, pulse/heart monitors with wireless connectivity, jewelry and so on, universal serial bus (USB) sticks with wireless capabilities, modem data cards or any combinations of these or the like. Each of the user devices is provided with wireless communication capabilities and appropriate electronic control apparatus 21, 23 and 25 for enabling operation thereof in accordance with the herein described principles. Thus the user 10 can have multiple personal electronic wireless devices with him/her.

FIG. 1 shows further a device 1 of another party, for example a terminal apparatus of a provider or goods and/or services. The other party device is also provided with wireless communication capabilities and appropriate electronic control apparatus 2 for enabling operation thereof in accordance with the herein described principles. More detailed examples of the other party device will be given below.

Dashed line 5 denotes the interface between the parties. It is noted that although FIG. 1 shows a situation where one user forms one of the parties, the user can be understood also as a group of associated users forming an identifiable party of an action requiring a security operation. Thus the expressions user devices and devices associated with a user can be understood to refer to a set of user devices, regardless the number of users.

Communications between the user devices and the other party device can be based on various technologies. The wireless devices may be capable of sending wireless signals to and/or receiving wireless signals on a link provided by a cellular system, a local wireless system such as e.g. a wireless local area network (WLAN), and/or a short range link such as a short range radio or optical link. Short range radio links such as the Bluetooth™ are standardised and therefore require no further explanation. Solutions based on near field communication (NFC) are also a possibility. NEC is a set of standards for wireless devices to establish radio communication between parties by touching them together or at least bringing them into close proximity. NFC builds upon radio-frequency identification (REID) systems by typically allowing two-way communication between endpoints. NEC can also be used to enable short range radio links such as the Bluetooth™ on the communicating devices, to instantly pair them and to disable the radio link once complete automatically on both devices.

Devices capable of wireless communications and participating security operations are typically controlled by at least one appropriate controller apparatus or circuitry so as to enable operation thereof and control various aspects of the operations. The control apparatus or circuitry can be interconnected with other control entities. FIG. 2 shows an example of control apparatus 30 capable of operating in accordance with the embodiments, for example to be coupled to and/or for controlling any of devices 1, 20, 22 and 24 shown in FIG. 1. The control apparatus can be configured to provide control functions in association with determination of various information such as what security information is needed, where and how to provide such information, generation and communication of information between the various devices and/or control functions based on such information by means of the data processing facility thereof in accordance with the certain embodiments described herein. For this purpose the control apparatus comprises at least one memory 31, at least one data processing unit 32, 33 and an input/output interface 34. The control apparatus can be configured to execute an appropriate software code to provide the control functions. For example, the control apparatus can provide required functionality for control of determinations, measurements, decoding/encoding, user input/output, signalling and/or other functionalities of the devices. The control apparatus and functions may be distributed between a plurality of control units.

The data processing, storage and other relevant control apparatus may be provided on an appropriate circuit board and/or in chipsets. A processor and a memory may comprise but are not limited to one or more microprocessor, processor with accompanying digital signal processor(s), processor without accompanying digital signal processor(s), dual-core and multi-core processor, special-purpose computer chips, field programmable gate arrays, controllers, application specific integrated circuits, application-specific integrated circuits, and computer.

Security operations, for example verification, authorization and/or authentication of a user can be provided through selectable use of the multiple of user devices. User devices that shall be used for a security operation can be determined based on a predetermined criteria. In accordance with a possibility security credentials such as password and/or other security codes are shared between two or more user devices. When multiple user devices are in near enough distance and used regularly security credentials can be shared with the two or more devices.

In accordance with an embodiment shown in the flowchart FIG. 3 a determination is made at 100 regarding a combination of user devices for a security operation from a set of at least two associated user devices configured to wirelessly communicate security information. Based on the determination security information is communicated at 102 by the determined one or more user devices associated with the user.

The determining of needed user devices can be provided e.g. at a terminal apparatus and/or server or another processor apparatus of the other party of an action to be secured. The determination, or at least a part of it, can also be provided at a first user device, for example a smartphone. According to a possibility a second user device, i.e. the device that is not in the initial contact with the other party determines whether it needs to participate in the security operation and send any security information. For example, the second device can interact with the first device and payment terminal to determine if involvement thereof is needed. The determination can be based on predetermined criteria. Exemplifying criteria will be discussed later in this description.

For example, if an action to be secured is not considered to require enhanced level of security, security information is provided only by one of the user devices, e.g. a user device the user uses for contacting the other party. However, if higher level of security is determined necessary, e.g. because of the importance and/or value of the action, security information by the first device and at least one additional user device is communicated to the other party. The embodiment enables selective communication of security information between the parties based on predefined criterion. This assists in optimising the use of the wireless communications resources. The optimisation can be made in view of the air interface resources and/or the device resources.

In accordance with an embodiment security credentials such as a password or another security code is broken into two or more parts which are stored in respective at least two user devices. In accordance with a possibility the security credentials are broken into as many parts as there are devices. According to alternative possibility a number of parts is used that is different from the number of devices. Thus, for example, one of more of the devices may provide more than one part of the credentials. At least a part of the credentials can be input by the user. The individual parts of the security credentials can be encrypted. When complete security credentials of a user are needed, for example to verify a transaction such as a payment the user is attempting to make, the device used for the payment can connect with the at least one other user device in its proximity to acquire the remaining part(s) of the security credentials, or to trigger sending of the other part to the other party directly from the second user device.

Breaking passwords and other credentials into parts and distributing these parts over a multiple of devices can reduce a security risk caused by storage of similar credentials such as complete passwords on multiple devices. In this embodiment a breach in one device or some of the devices does not compromise the overall security of the user as the other parts of the needed credentials would still not be available.

User devices can connect individually to an action processor device, for example a payment terminal, a payment backend or another processor apparatus of the other party. According to an embodiment at least a part of the communications is routed via a selected one of the devices.

A possibility is that the devices jointly combine security credentials from the different devices to provide a single security code or the like. One of the devices then communicates the combined security information to the other party as required.

In accordance with an embodiment, where shared security credentials are used, the at least two user devices need to be located in predefined manner relative to each other to be able to verify the transaction payments and share the security credentials. In accordance with a possibility the user device, e.g. a smartphone and a wearable device need to be within a predefined proximity of each other to validate a password. For example, the user devices need to be e.g. within 30 centimeters from each other to allow an action to proceed. If the smartphone and the other user device are further away of each other, but either one of the user devices is used with a other party device in operation determined to require enhanced security, the part of password in this user device is not passed to the other party terminal and thus the action cannot be processed or verified. Thus, if all user devices needed to cause compiling of a complete set of security credentials, e.g. a complete password, are not proximate enough a complete set of security credentials cannot be provided and no useable security information is available. Consequently, the action to be secured cannot be completed.

User can be notified of intended payment or other action on a user device when one of the devices in the defined set of user devices is connected with the other party, but a payment or another action is denied for example because the devices are not close enough to each other or for other reason. If one of the user devices is stolen, an alert can be provided for the user still in possession of one of the devices. When the devices are not close enough a first action can be to notify the user to move the devices closer to each other. If one of the devices is still tried to be used for payment without proximity of the second device, the device can be determined as stolen or for other reason misused for example after three attempts. Such a device can be configured to lock itself for a period of time and/or delete the credentials stored on the device. If device is capable at that point to connect to known user devices it could connect with one and alert the user. The distance determination can be based on for example, device sensors. A more particular example of such sensors are those based on short range radio links such as Bluetooth™ and/or Near Field Communications (NFC) which can be used to detect the "signal" strength and/or direction between devices and based thereon determine the distance and/or relative position. Arrangements that utilise placement of antenna can also be used to detect the direction of device from each other and/or distance.

In this embodiment security is not compromised even if one of the devices e.g. a smartphone is stolen or lost since the complete security credential can only be obtained if all devices needed for the credentials are close enough. In accordance with an embodiment user devices of a defined set of user devices and a terminal device of the other party need to be within predefined proximity for a successful security operation.

Multiple personal devices providing security features can be used for security operations such as detection or identification of a user, authentication mobile payments and other transactions and/or improving security in relation to other different actions and applications. An example in view of identity detection is where a user is identified based on the order of devices used for an action. For example, if a user has originally defined that his/hers smartwatch shall be used for small payments but it is then detected that attempts are made to use the phone of the user for a payment (potentially repeatedly) it can be determined that the person holding the phone is not the rightful user. Identity detection based on the order of the devices can be provided in combination with the proximity detection. A user can also be identified based on PIN codes such that if a user device is PIN-locked, the user unlocking the device is identified based on the unique PIN. Other techniques such as identification based on sensor arrangements such as pulse/heart rate monitor, fingerprint or iris detectors and so on can also be used.

In accordance with an embodiment it is determined by a user device that a payment terminal of another party requires all parts of security credentials for a payment that is lower than the predefined limit. The user device can be configured to determine that the request shall be denied and no credentials shall be provided to prevent a third party from successfully creating false payment authorization requests. The determination can be provided by any of the user devices. This can be especially useful in applications where payment terminal requests are generated by a payment backend managed by a bank or credit card company and where the payment terminal should not request credentials if those are not needed based on the predefined values.

An exemplifying use scenario will now be described with reference to FIG. 4. Direct connections can be provided from respective user devices to a device of the other party requiring security details, for example a payment terminal or a backend server of another party of a transaction is provided. In this specific example a user 10 is associated with a user device such as a smartphone 20 and a wearable user device 22, for example a smart watch. The user can use the smartphone 20 as a primary device for payments that are verified by a payment backend 26. Differentiation between different levels of authentication and number of user devices is provided based on the value of the transaction. In this example the predefined criteria is based on the value of the transaction such that all payments over 15 EUR require additional authentication whereas those of a lower value are handled with a basic level security procedure.

Therefore, if the user pays a 4 EUR e.g. for a train ticket with the phone, no additional authentication is determined necessary. In the train the user can buy a lunch worth of 17 EUR and pay this with the phone. At this occasion a payment terminal 1 determines that an additional authentication is required because of the to 15 EUR limit. In response to the determination, the terminal delivers a request thereof to the smartphone, thus triggering added security operation where more than one user device is needed. Based on the request the smartphone 20 determines that additional security information is needed, and forwards the payment information with data from the payment terminal 1 to the smart watch 22, thus causing appropriate security operation at the smart watch. The smart watch connects over a local short range link, e.g. low energy Bluetooth™ or infrared, directly to the payment terminal 1 and provides a second part of a passcode required for authentication.

For the determination the payment terminal 1 can connect with a backend server 26 managed e.g. by a financial institution such as a bank or credit card company. The backend server is aware of the thresholds which can have been set e.g. when an account is created or updated for the user. In some embodiments a user can also be allowed to set personal limits in the devices through an interface presented via one of the devices when all devices are in close proximity using personal PIN-code or password.

The payment terminal can deliver the required parts of an encrypted passcode to the payment backend 26. The backend combines the two or more parts and uses the passcode to confirm the payment. After the payment is confirmed the connections between payment terminal and user devices can be closed.

In accordance with another exemplifying use scenario shown in FIG. 5 connection with another party device requiring authentication is provided via a first user device, which in this example via the smartphone 20. For example, a 20 EUR payment exceeding a predefined limit is made by the user. This is determined to require a multi-device authentication of the user. As shown, the smartphone 20 used for the payment is connected to the other party device 1 for the security operation. The smartphone can thus provide the first part of the required security credentials for the security operation. In addition, the smartphone notifies the smart watch 22 of the payment. The smart watch connects to the payment terminal over the connection already provided by the smartphone to deliver the second part of the passcode to the payment terminal.

The payment terminal can then deliver the two parts of the passcode to a payment backend, if one is used. Backend combines the passcode and confirms the payment.

According to an exemplifying use scenario manual verification of a transaction is provided by means of two user devices. This example is explained in the context of a high value item, for example a motor vehicle. A user wants to buy a car worth of 7000 EUR and initiates a payment transaction with his smartphone. The payment terminal of the other party of the transaction determines the high value of the transaction and requires an authentication from the user device before processing payment. The phone presents a user interface in which the user types in a passcode. After passcode has been received and confirmed by the phone, the phone connects with a smart watch or another second device of the user to initiate a similar procedure. The second device requires the user to type in a second set of security credentials, e.g. a second passcode. After the second passcode is validated the connectivity from the smartphone and from the second device to the payment terminal is established and required authentication/password delivered to the payment terminal. The payment terminal delivers the parts of the password to a payment backend which combines the parts to obtain complete password and confirms the payment.

FIG. 6 is a flowchart illustrating an example where a transaction such as mobile payment is detected at 60. In 61 it is determined that a security operation such as verification is needed, and then at 62 is it determined that the value exceeds a predefined threshold. Because of this it is determined at 63 that a second verification is needed. In 64 and 67 a first user device and a second user device detect each other. Authentication follows at 65 and 68 in the respective devices where after a first part and a second part of security credentials are communicated to the other party. At 70 the security credentials are checked and if the outcome of the check is positive, the mobile payment is confirmed.

In the above examples the transaction terminal or server infrastructure or another third party device combines the security credentials to verify and process a payment or to complete other actions. This can have an advantage in that a complete set of security is not available for any user device. However, for certain applications it may be possible for a user to combine security credentials.

In addition to being in close proximity a personal identification number (PIN) code can be requested from both user devices to ensure authentication. Also, a PIN code can be requested for sharing password files, or as example for a credit card PIN code the first two numbers of the PIN code could be typed in with the first device and next two with the second device.

In accordance with an embodiment multiple devices with a split password need to be in close proximity with a third device of another party to allow the user to be authenticated/authorized and the third device to complete an action. In this scenario all devices need thus to be in close proximity to each other. However, if e.g. cellular network or WLAN is used for the communications between the parties, then proximity may only be necessary in certain embodiments between the user devices providing the required parts of the security credentials.

Different security levels are provided. For example, payments under 5 Euros can be done with a mobile phone or a watch only. These do not necessarily require verification or personal identification number (PIN) and thus small payments can be made even without any verification. Payments under 20 Euros can be done when both user devices are in a predefined range, e.g. within one meter. Payments over 20 Euros can be done only when both user devices are in range of 30 centimeters or e.g. when user is holding the phone in the same hand as the watch. Payments over 500 Euros can be done only when both user devices are in range of 30 centimeters from the payment terminal. In this case the user needs to intentionally place the smartphone and smartwatch near the other party payment terminal.

FIGS. 7A-7D illustrate further example where different combinations of devices in close proximity of each other can be used to provide different levels of security. FIG. 7A illustrates a first level "circle of trust" 74 deemed appropriate for low value transactions between a user device 72 and a payment terminal 74. A payment below a predefined limit can be confirmed with the user device 72 alone without credentials. User device 73 associated with the user device 72 is not needed.

FIG. 7B illustrates a second level "circle of trust" 76 suitable for transactions of a value exceeding a first threshold but less than a second threshold. In this level a successful transaction requires user device 72 and user device 73 to be within predefined proximity. However, user device 73 does not need to interact with the payment terminal 74. No credentials are handed over to the payment terminal.

FIG. 7C illustrates a situation where a third level "circle of trust" 77 is launched. The transaction is now determined to be of equal or higher value than the second threshold buy less than a third threshold. The predefined user devices 72 and 73 now require proximity with each other to confirm payment and communication of credentials to the payment terminal 74.

In FIG. 7D a fourth level of "circle of trust" 78 is provided in response to determination that the transaction is equal to or exceeds the third threshold. In this occasion all devices 72, 73 and 74 are required to be in close proximity to confirm the transaction and to communicate the required credentials.

In accordance with one scenario a payment backend is configured to be the only party which knows the correct order of user credentials shared between the user devices or the correct manner to combine the user credentials. If a code is combined incorrectly or the parts thereof are sent in incorrect order, even if all parts are provided, the transaction is denied.

An example of this is shown in FIG. 8 in connection with a payment transaction. In 80 a payment terminal determines that confirmation of a payment is needed. At 81 a second user device provides the credentials in its possession. The transaction is denied at 82 because the first part of the credentials is missing. User of the first user device can be notified at this stage and be prompted to use the first device. The second device is allowed further attempts. In this example two further attempts are allowed but the attempts at 83 and 84 are again denied at 84 and 86, respectively, because of lack of credentials from the first device. The device is reported stolen at 86 and the user of the first device is alerted.

FIG. 9 shows an example of a situation where the transaction is denied because of incorrect source of a part of the credentials. In 90 a payment terminal determines that confirmation of a payment is needed. At 91 a second user device provides the credentials in its possession. The transaction is denied at 92 because the first part of the credentials is missing. User of the first user device can be prompted to use the first device, and the second device is allowed to have further attempts. However, at 93 the received first part of the credentials comes from the second device, and not the first device. In response thereto the transaction is denied at 94. This can be based on a rule that a single device shall not have all parts of the security credentials. The second device can be reported stolen and the user of the first device provided with a notification.

The type of the security operation and the procedure can also depend on the device that is first connected with the other party terminal. For example, for a small payment first device connected with a transaction terminal can be a smartwatch. In this case the user does not need take his/hers phone out of the pocket to buy e.g. a bus ticket or access a building with a low security classification. A higher value payment or access to a building with a higher security classification would, however, require first connection to be established with the smartphone. Thus, in accordance with a possible scenario a primary user device can be defined e.g. for payments of certain value. When a low value payment is initiated with e.g. a smartphone instead of a smartwatch that has been set as a primary device the payment terminal can deny the payment based on the predefined order of the devices and the threshold. In case of a high value payment the initiation of payment shall be done with smartphone set as a primary device for high value payments and a secondary confirmation would then be required from the smartwatch.

The number of user devices is in the increase and by splitting the credential between a number of devices and defining an order in which these need to be used will make an unauthorized use harder. A user of the devices needs to know the correct order of the devices for passing the security operation even when he/she is in the possession of all necessary devices and these are in close proximity to each other.

Each device with wireless capabilities is typically provided with a unique identifier. In a typical scenario this cannot be changed by the user. In accordance with an embodiment the unique device identifier can be used together with the order of devices and the information of which part of credentials is shared with which device enables multiple unique combinations to verify the security of devices. When this is combined with the need of proximity of devices the complexity of interfering with the solution can be further increased. For example, if a single device has all parts of the credentials, a person attempting to breach the system would also need to know the device identities, for example International Mobile Equipment Identity (IMEI) of the mobile devices to be able to proceed with a transaction. Thus, in this scenario it is not enough if all correct parts of the credentials are provided in correct order, but there would also need to be a change and/or forgery of one or more the device identity. Otherwise a controlling trusted entity that has information of the credentials and the device identities can deny the requested action.

As mentioned above, the password, PIN-code or any other user credential can be distributed between a plurality of devices that need to be in near distance of each other for the multi-device security application to proceed successfully. In case of certain near field communication technologies, the first part of the security credentials can be given to a payment terminal by tapping the terminal with the smartwatch. If it is determined by the payment terminal of one of the user devices that enhanced security is needed, the second part of the credentials can be given by tapping the terminal with smartphone. After receiving all the needed parts of the credentials the payment terminal can confirm the payment. If only smartphone is present, the payment terminal does not confirm the payment if it exceeds a pre-defined value.

In accordance with an embodiment, for enhanced security, the devices need to be in a predefined distance prior to sending even the first part of password to the payment terminal.

Additional level of security can be added by a determination whether the security information provided by another device is compromised, e.g. hacked.

The security credential can be at least in part input by the user, for example in response to a user interface displayed to the user. The display can be controlled by the display software and hardware of the device. At least a part of the credentials may be stored in the respective device. For example, a passcode or part thereof may be stored in a secure environment of the device, for example in a subscriber identity module or authentication module of the user device.

In accordance with a yet further embodiment it is possible to determine devices which should not be in proximity of user device(s) involved in an action to be secured. For example, it is possible that a user is not be allowed to have a personal phone or another communication device on or even with him when in a high security location. When an authorized user device of the user is used for authentication it can detect the non-allowed device in close proximity. In response thereto the authorized user device declines to send credentials for example to open a door.

In addition to e.g. handheld user devices or wearable user devices other types of user devices associated with one or more users can be used. For example, devices such as office and home electronics and used in accordance with the above described principles. In accordance with a more detailed example a vehicle is equipped with communication capabilities, such as a short range communication chip or WLAN chip, and can be provided with appropriate circuitry for providing identification, authorization and/or payment capabilities for a security operation. The security operation can be provided for example in relation to parking, road tolls, access and so on. A vehicle can be adapted to require close proximity of at least one other user device to complete the transaction of required security credentials e.g. for a payment of a vehicle related fee and/or gaining access to a site.

Different combinations of different devices can be used to provide a different level of authorization.

According to an example appropriate apparatus or means are provided for controlling a device, for example a handheld device, a wearable device, an otherwise mobile device or a device of the other party of a transaction, to provide the various embodiments. For example, mean can be provided to determine based on a predetermined criteria a combination of one or more user devices to be used for a security operation from a set of associated user devices configured to wirelessly communicate security information. These means are co-operative with means for causing communication of security information by the determined combination of one or more user devices. Means for determining that at least two user devices each having a part of security credentials are located in a predefined manner relative to each other cam also be provided. The means can be adapted for determining the distance between the at least two user devices, and for controlling use of more than one of the user devices for the security operation accordingly. Means for determining the outcome of the security operation based on the order security information is provided by at least two user devices and/or the source of security information can be provided. Means for causing presentation of a notification via at least one user device of the set of associated user devices in response to determination an unsuccessful security operation can also be provided.

It is noted that whilst embodiments have been described using mobile user devices and a fixed other party terminal as examples, similar principles can be applied to any other user and other party terminal devices capable of wireless communications and where security operation is needed between the parties. Also, although the detailed examples concentrate on securing transactions such as payments the invention in not limited by these. For example, a transaction to be secured can comprise communication of confidential information, exchange of contracts, sending of electronic signature of the user, identification of the user and so forth, Therefore, although certain embodiments were described above by way of example with reference to certain exemplifying mobile devices and technologies and uses thereof, the principles can be applied to any other suitable forms of devices and applications than those illustrated and described herein.

The required data processing apparatus, functions and circuitry at the relevant devices may be provided by means of one or more data processors and other hardware and software. The described functions may be provided by separate processors or by an integrated processor. The data processing apparatus may be of any type suitable to the local technical environment, and may include one or more of general purpose computers, special purpose computers, microprocessors, digital signal processors (DSPs), application specific integrated circuits (ASIC), gate level circuits and processors based on dual-core or multi-core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic Memory devices and systems, optical memory devices and systems, fixed memory and removable memory, including appropriate types of random access memory (RAM) and read-only memory (ROM).

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, for example for controlling communications, user interface, and data processing, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD, and a cloud storage arrangement.

As used in this specification, the term circuitry refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/ software (including digital signal processor(s)), software, and memory(ies) that work together to cause an apparatus, such as a mobile phone or server, to perform various functions) and (c) to circuits, such as a microprocessor(s) or a portion of a microprocessor(s), that requires software or firmware for operation, even if the software or firmware is not physically present. This definition of circuitry applies to all uses of this term in this specification, including in any claims. As a further example, as used in this specification, the term circuitry also covers an implementation of merely a processor (or multiple processors) or portion of a processor and its (or their) accompanying software and/or firmware. The term circuitry also covers, for example and if applicable to the particular claim element, a baseband integrated circuit or applications processor integrated circuit for a mobile device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method comprising
determining, based on predetermined criteria, a combination of at least two user devices to be used for a security operation from a set of user devices associated with a first user and configured to wirelessly communicate security information,
wherein the at least two user devices each comprise only one part of a security credential associated with the first user;
determining that the at least two user devices are located in a predefined manner relative to each other; and
in response to the determining that the at least two user devices are located in a predefined manner relative to each other, causing communication of security information by the determined combination of the at least two user devices to another party,
wherein causing communication of security information comprises causing communication of only the one part of the security credential comprised by at least one of the user devices, and
wherein the security information comprises the security credential.

2. A method according to claim 1 wherein the predetermined criteria is based on required level of security.

3. A method according to claim 2 wherein the required level of security depends on the value and/or importance of an action to be secured by the security operation.

4. A method according to claim 1, comprising determining the distance between user devices and controlling use of user devices for the security operation accordingly.

5. A method according to claim 1, comprising determining by an action processor device that more than one user device is needed for securing an action, and communicating from the action processor device to a first user device or directly to at least one second user device instructions for causing communication of at least part of a security credential from the at least one second user device.

6. A method according to claim 1, comprising determining by a first user device that more than one user device is needed for securing an action, and communicating from the first user device to at least one second user device instructions for causing communication of at least part of a security credential from the at least one second user device.

7. A method according to claim 1, comprising receiving at least part of a security credential from at least one second user device and sending the received at least part of a security credential to a data processing device of another party of a transaction to be secured.

8. A method according to claim 1, comprising communicating from a first user device to a second user device instructions to provide at least part of a security credential, and communicating from the second user device at least part of a security credential to another party directly or via the first user device.

9. A method according to claim 1, comprising determining the outcome of the security operation based on information of the order security information is provided by at least two user devices and/or the source of security information and/or identity of at least one user device.

10. A method according to claim 1, comprising causing presentation of a notification via at least one user device of the set of associated user devices in response to determination an unsuccessful security operation.

11. An apparatus comprising at least one processor, and at least one memory including computer program code, wherein the at least one memory and the computer program code are configured, with the at least one processor, cause the apparatus at least to:
determine, based on predetermined criteria, a combination of at least two user devices to be used for a security operation from a set of user devices associated with a first user and configured to wirelessly communicate security information,
wherein the at least two user devices each comprise only one part of a security credential associated with the first user; and
cause wireless communication of security information by the determined combination of the at least two user devices to another party,
wherein the apparatus is caused to cause wireless communication of security information by causing communication of only the one part of the security credential comprised by at least one of the user devices, and
wherein the security information comprises the security credential.

12. An apparatus according to claim 11 wherein the predetermined criteria depends on the value and/or importance of an action to be secured by the security operation.

13. An apparatus according to claim 11, configured to determine that at least two user devices, each having at least a part of a security credential associated with the first user, are located in a predefined manner relative to each other, and in response to the determining cause communication of said parts of security credentials.

14. An apparatus according to claim 11, configured to determine the distance between two or more user devices and control use of user devices for the security operation accordingly.

15. An apparatus according to claim 11, configured to determine that more than one user device is needed for securing an action, and in response thereto cause communication from an action processor device to a first user device or directly to at least one second user device instructions for causing communication of at least part of a security credential from the at least one second user device.

16. An apparatus according to claim 11, configured to determine that more than one user devices is needed for securing an action and in response thereto cause communication from the first user device to at least one second user device instructions for causing communication of at least part of a security credential from the at least one second user device.

17. An apparatus according to claim 11, configured to cause communication from a first user device to at least one second user device instructions to provide at least part of a security credential to another party directly or via the first user device.

18. An apparatus according to claim 11, configured to determine the outcome of a security operation based on information of the order security information is provided by at least two user devices and/or the source of security information and/or identity of at least one user device.

* * * * *